United States Patent
Lopez-Baquero et al.

[11] Patent Number: 6,070,932
[45] Date of Patent: Jun. 6, 2000

[54] VEHICLE

[75] Inventors: Jorge O. Lopez-Baquero; Armando Torres-Vázquez, both of P.O. Box 364904, San Juan, Puerto Rico 00936-4904

[73] Assignees: Jorge O. Lopez-Baquero, Carolina; Armando Torres-Vazquez, San Juan, both of Puerto Rico

[21] Appl. No.: 09/020,409

[22] Filed: Feb. 9, 1998

[51] Int. Cl.[7] .................................. B60J 5/00; B60J 7/00
[52] U.S. Cl. .................. 296/146.9; 296/19; 296/181; 296/106
[58] Field of Search .................. 296/181, 56, 146.8, 296/146.9, 19, 20, 24.1, 24.2, 100.06, 106

[56] References Cited

U.S. PATENT DOCUMENTS

| | | |
|---|---|---|
| D. 268,257 | 3/1983 | Horton . |
| 1,534,337 | 4/1925 | Watson . |
| 1,614,598 | 1/1927 | Brainard . |
| 2,132,409 | 10/1938 | Gedeon . |
| 2,337,505 | 12/1943 | Swift ........................................ 296/19 |
| 2,569,218 | 9/1951 | Bailey . |
| 2,656,214 | 10/1953 | Alamagny ................ 49/36 X |
| 2,825,301 | 3/1958 | Quist . |
| 3,148,911 | 9/1964 | Boyer et al. ................ 296/19 |
| 4,027,739 | 6/1977 | Allenthorp et al. . |
| 4,225,153 | 9/1980 | Bez et al. .................... 296/19 |
| 4,389,066 | 6/1983 | Weir et al. .................. 296/19 |
| 4,530,538 | 7/1985 | Greene et al. . |
| 4,676,545 | 6/1987 | Bonfilio et al. . |
| 4,842,326 | 6/1989 | Divito . |
| 5,012,880 | 5/1991 | Abner . |
| 5,301,997 | 4/1994 | Cudden . |
| 5,573,300 | 11/1996 | Simmons . |
| 5,755,478 | 5/1998 | Kamiya et al. ........................ 296/19 |

OTHER PUBLICATIONS

"The Autocar", p. 877, Aug. 26, 1949.

*Primary Examiner*—Dennis H. Pedder
*Attorney, Agent, or Firm*—Smith Gambrell & Russell, LLP

[57] ABSTRACT

Apparatus for emergency medical treatment includes a towing vehicle, a trailer vehicle, and a hitch connecting the trailer vehicle to the towing vehicle. The towing vehicle and the trailer vehicle are no more than about five feet wide to facilitate movement of the apparatus through congested areas. The trailer is provided with emergency medical equipment including a cardiac defibrillator, an intravenous fluid delivery system, a sphygmomanometer, and a removable patient cot for supporting a person receiving emergency medical treatment. A bench in the trailer vehicle, used by an emergency medical technician, is longitudinally aligned with the patient cot to minimize the width of the trailer. The trailer has a hinged roof portion which is vertically swingable from a lower closed position to an upper open position, an end door assembly which includes an end door and a movable roof panel which are rigidly connected together. The movable roof panel is upwardly swingable from a closed lower position to a raised open position. The end door assembly is upwardly swingable with the roof panel from a closed lower position to a raised upper position. A side door of the vehicle is outwardly swingable from a closed position to an open position; and, edges on the side door engage and seal against the end door and the roof panel when the movable roof panel, the end door, and the side door are in their closed positions.

19 Claims, 1 Drawing Sheet

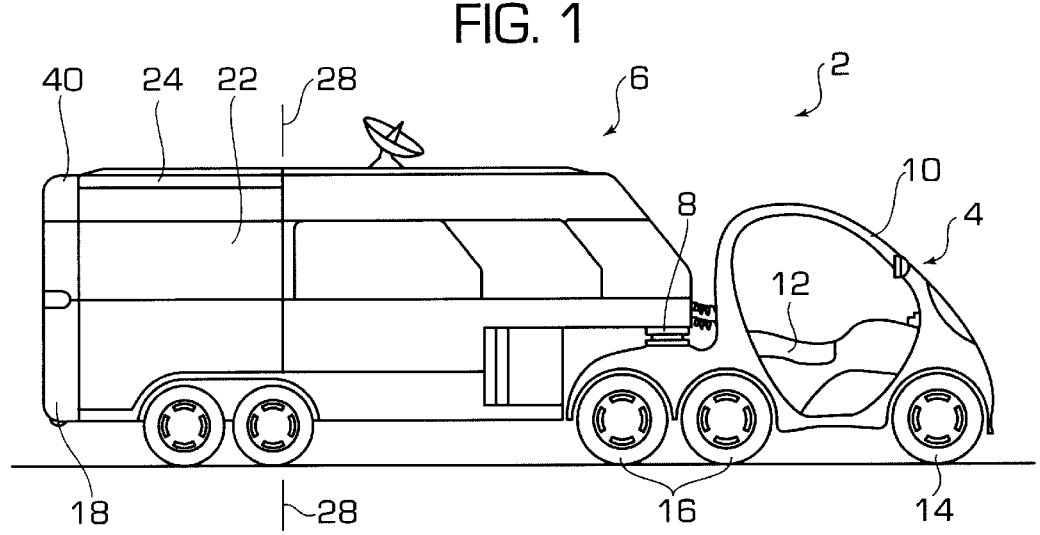
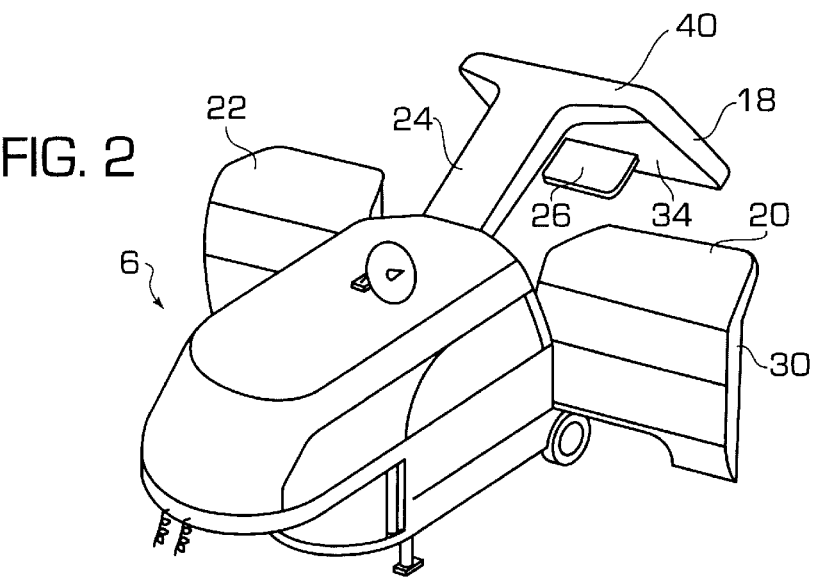
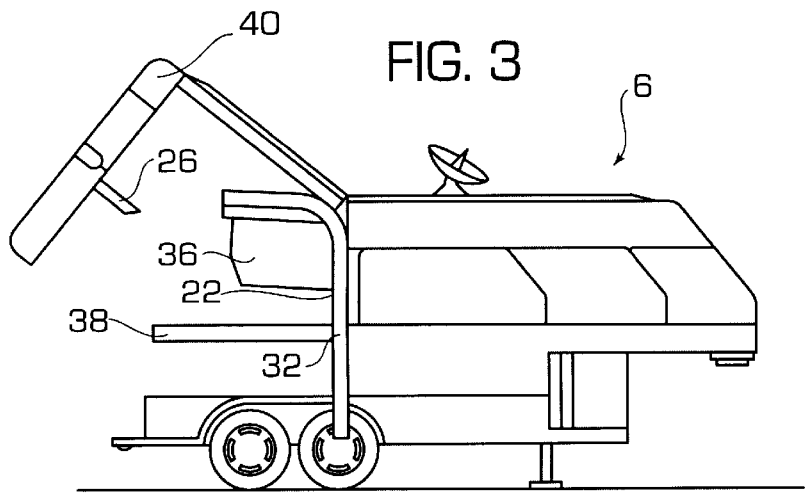

VEHICLE

BACKGROUND OF THE INVENTION

This invention relates to a vehicle with a door arrangement which is improved in the respect that, when the doors are open, there is convenient access to the interior of the vehicle in contiguous regions of both the sides and an end of the vehicle.

Various vehicles have a need for accessibility to their interiors. This is particularly true of an emergency medical vehicle which is narrow enough to travel through areas of traffic congestion. Due to the narrow body of such a vehicle, emergency medical technicians, when attending to a patient lying in the emergency vehicle at the accident site, need maximum accessibility because they must stand beside the vehicle.

Traffic congestion caused by automobile accidents frequently delays the arrival of emergency vehicles at the accident site. Accident victims are deprived of receiving emergency medical treatment during the post-impact hour where the possibilities of survival are the highest.

A vehicle highly suited for such situations is an narrow articulated vehicle which includes a steerable towing propulsion vehicle, and a trailer vehicle which is equipped with the usual facilities used by emergency medical technicians. Such an articulated vehicle is highly maneuverable so that it can travel through congested areas in order to reach an accident site and travel from the accident site to a hospital or to an uncongested area where the patient can be transferred to a conventional ambulance or other rescue vehicle.

SUMMARY OF THE INVENTION

In one respect, the invention is a vehicle which has a hinged roof portion which is vertically swingable from a lower closed position to an upper open position, an end door assembly which includes an end door and a movable roof panel which are rigidly connected together, wherein the movable roof panel is upwardly swingable from a closed lower position to a raised open position. The end door assembly is upwardly swingable with the roof panel from a closed lower position to a raised upper position. A side door of the vehicle is outwardly swingable from a closed position to an open position; and, edges on the side door engage and seal against the end door and the roof panel when the movable roof panel, the end door, and the side door are in their closed positions.

Preferably, the roof panel and the rear door are substantially perpendicular to each other; the movable roof panel has a width which is less than one-half the width of the rear door; and the vehicle has emergency medical equipment and a removable patient cot for supporting a person for emergency medical treatment. Also preferably, there are two side doors which are on opposite sides of the vehicle; the side doors and the roof panel are hinged substantially in a same transverse vertical plane. The side doors and the end door assembly are hinged at least two feet from the end of the vehicle and/or the side doors and the end door assembly are hinged at least 30% of the vehicle's length from the end of the vehicle. The rear door has a forwardly-facing surface and the side doors have a rear edge which engages the forwardly facing surface of the rear door. The vehicle can be a trailer which has the end door at its rear end and a hitch at its front end for engagement by a towing vehicle.

In another respect, the invention is a vehicle which has a hinged roof portion which is vertically swingable from a lower closed position to an upper open position, an end provided with an end door assembly which includes an end door and a movable roof panel which are rigidly connected together. The movable roof panel is substantially perpendicular to the movable roof panel and it is upwardly swingable from a closed lower position to a raised open position. The end door is upwardly swingable with the roof panel from a closed lower position to a raised upper position. Two side doors are provided on opposite sides of the vehicle, and each of these side doors is outwardly swingable from a closed position to an open position. Each of the side doors and the roof panel are hinged substantially in a same transverse vertical plane which is at least two feet the end of the vehicle. Each of the side doors has edges which engage and seal against the end door and the roof panel when the movable roof panel, the end door, and the side doors are in their closed positions.

In still another respect, the invention is a trailer vehicle for emergency medical treatment. The trailer is equipped with emergency medical equipment and a removable patient cot for supporting a person for emergency medical treatment. The trailer body has a front end provided with a hitch which is engagable by a towing vehicle, and a rear end provided with an end door assembly which includes an end door and a movable roof panel which are rigidly connected together. The movable roof panel is upwardly swingable from a closed lower position to a raised open position. The end door is being upwardly swingable with the roof panel from a closed lower position to a raised upper position. Two side doors are located on opposite sides of the vehicle, and the side doors are outwardly swingable from a closed position to an open position. Each of the side doors has edges which engage and seal against the end door and the roof panel when the movable roof panel, the end door, and the side door are in their closed positions.

From another perspective, the invention is an apparatus for emergency medical treatment, comprising: a towing vehicle, a trailer vehicle, and a hitch connecting the trailer vehicle to the towing vehicle. The towing vehicle and the trailer vehicle are no more than about five feet wide to facilitate movement of the apparatus through congested areas. The trailer has emergency medical equipment including a cardiac defibrillator, an intravenous fluid delivery system, a sphygmomanometer, and a removable patient cot for supporting a person receiving emergency medical treatment. A bench in the trailer vehicle, used by an emergency medical technician, is longitudinally aligned with the patient cot to minimize the width of the trailer vehicle.

BRIEF DESCRIPTION OF THE DRAWINGS

FIG. 1 is a side view of an emergency medical vehicle provided with the improved door arrangement according to the invention.

FIG. 2 is a perspective view of the trailer vehicle, showing the doors in an open position to provide access to the patient-receiving area inside the vehicle.

FIG. 3 is a side view of the trailer vehicle of FIG. 2 in which the doors are in their open positions.

DETAILED DESCRIPTION OF THE PREFERRED EMBODIMENT

As shown in FIG. 1, an articulated emergency medical vehicle 2 includes a towing vehicle 4 and a trailer vehicle 6, connected together by a fifth-wheel type hitch 8 which permits the trailer vehicle 6 to swing horizontally relative to the towing vehicle 4. To facilitate movement through congested traffic, the vehicles 4 and 6 are no more than about five feet wide.

The towing vehicle 4 includes a cab 10 with a driver's seat 12, a propulsion engine, steerable front wheels 14 and load bearing wheels 16 which are symmetrically arranged around the vertical axis of the hitch 8.

The trailer vehicle 6 has its fifth-wheel hitch element 8 at its front end. At its rear end, there is a novel three door arrangement which includes a rear door 18, a left side door 20 and a right side door 22. The trailer body including its roof and doors is a rigid structure.

As shown in FIGS. 2 and 3, the rear door 18 is a component of an end door assembly 40 which also includes a movable roof panel. The rear door 18 is substantially perpendicular to, is supported by, and is rigidly connected to the roof panel 24. The width of the roof panel 24 is less than one-half of the width of the rear door 18. The roof panel 24 is upwardly swingable from a closed lower position shown in FIG. 1 to the raised open position is shown in FIGS. 2 and 3, thus also moving the rear door 18 from a closed lower position to a raised open position. A bench 26 for an attending emergency medical technician is mounted on the interior side of the rear door of the vehicle.

Both of the side doors 20 and 22 are supported on hinges which permit them to swing outwardly from the closed position shown in FIG. 1 to the open positions shown in FIGS. 2 and 3.

The hinges for the rear door assembly and the side doors are all at least two feet (and/or a distance which is at least 30% of the trailer's length) from the rear end of the trailer. As shown, all three doors 18, 20 and 22 are hinged in substantially the same transverse vertical plane which is identified at 28 in FIG. 1. The side doors 20 and 22 have rear edges 30 and 32 which, when in their closed positions, engage the forwardly facing surface 34 of the rear door 18.

The towing vehicle 4 is provided with the usual accessories, such as headlamps, brake lights, a siren and emergency warning lights. Another useful accessory is a global positioning system (GPS) which can inform the driver of his location and the location of the site where emergency treatment is needed.

The trailer 6 and/or the towing vehicle 6 are provided with radio, cellular, satellite or hardwired systems for recording, transmitting and receiving voice, data, and video signals. Data signals can indicate the patient's vital signs.

The trailer 6 has equipment including, for example, an oxygen cylinder and delivery unit, a cardiac defibrillator, an intravenous fluid delivery system, a sphygmomanometer, and other equipment and medical supplies. This equipment can be in cabinets such as those shown at 36 in FIG. 3, mounted on the side doors 20 and 22. The trailer 6 also has air conditioning and heating systems for the comfort and health of the patient and the attending emergency medical technician.

The benefits derived from the invention, when used in an emergency medical vehicle, will be appreciated from FIG. 3 which also shows a patient cot 38. When a patient is lying on the cot 38, emergency medical personnel can administer treatment from the rear, left and right sides of the patient, utilizing the appropriate equipment which is conveniently mounted on the side doors.

The use of the vehicle for emergency medical purposes will now be described. Upon receiving radio, telephonic or other notification of a need for emergency medical attention, the vehicle is dispatched to the rescue site. The location of the rescue site can be entered into the GPS system and the GPS system will calculate the fastest travel route.

Preferably, the vehicle is manned by two emergency medical technicians, one in the cab 10 driving the vehicle, and the other riding on the bench 26 inside the trailer.

Motorists hearing the siren can remain in their lanes, only moving to one side thereof. This will provide a clear path for the emergency vehicle which, due to its narrow width and articulated structure, is capable of winding its way through congested traffic.

Upon arriving at the rescue site, the side and rear doors are opened to the position shown in FIGS. 2 and 3, the patient cot is removed, the patient is placed on it, and it is returned to the vehicle where it occupies the position shown in FIG. 3. The patient's head is normally at the rear of the vehicle to facilitate the administration of emergency medical treatment until the patient has stabilized and, in the judgement of the attending personnel, it is appropriate to transport the patient to a hospital or other facility. The patient cot is then moved forward in the interior of the trailer to allow space in the rear of the trailer compartment for an attending emergency medical technician. The rear door assembly 40 is closed, the emergency medical technician sits on the bench 26 so he or she may observe and treat the patient, the side doors 20 and 22 are closed and the vehicle is driven to a hospital or other facility. Because the bench 26 is directly aft of the patient, the vehicle width can be quite narrow.

A video camera at the rescue site can be controlled remotely from the hospital by physicians equipped with zoom and joystick controls, thus enabling physicians at the hospital to assess injuries and determine appropriate treatments.

Rather than being towed to a rescue site, a trailer unit can be carried to the site by a helicopter. In multiple-patient situations, a number of units can be transported to the site simultaneously on a flatbed vehicle.

In some situations such as an athletic event where there is a large crowd and a need for emergency medical treatment is likely to arise, the invention may be used in a stationary mode, parked at the site of the event where it will be available if needed.

In some situations, only one side door may be provided. In others, the vertically swinging door may be at the front end rather than the rear end of the vehicle.

Persons familiar with the field of the invention will recognize that it may take many forms other than the specific embodiment disclosed herein. For example, the door arrangement may be used in vehicles other than emergency vehicles or trailers. A ball-type trailer hitch may be used instead of a fifth-wheel hitch. Accordingly, the invention is not limited to the disclosed embodiment but encompasses variations, modifications and improvements thereto which fall within the spirit of the following claims.

We claim:

1. A vehicle, comprising:
   a vehicle end provided with an end door assembly which includes an end door and a movable roof panel which are rigidly connected together, said movable roof panel having a longitudinally extending edge;
   said movable roof panel being upwardly swingable from a closed lower position to a raised open position;
   said end door being upwardly swingable with said roof panel from a closed lower position to a raised upper position;
   a side door on a side of the vehicle, said side door being horizontally swingable about a vertical axis from a closed position to an open position;
   said side door having a vertically extending rear edge which engages and seals against the end door when the movable roof panel, the end door, and the side door are in their closed positions;

said side door having an upper edge which engages and seals against said longitudinally extending edge of the movable roof panel when the movable roof panel, the end door, and the side door are in their closed positions.

2. A vehicle according to claim 1, wherein said roof panel and said rear door are substantially perpendicular to each other.

3. A vehicle according to claim 1, wherein the movable roof panel has a width which is less than one-half the width of the rear door.

4. A vehicle according to claim 1, wherein the vehicle has emergency medical equipment and a removable patient cot for supporting a person for emergency medical treatment.

5. A vehicle according to claim 1, wherein the vehicle has two said side doors which are on opposite sides of the vehicle.

6. A vehicle according to claim 5, wherein the side doors and the roof panel are hinged substantially in a same transverse vertical plane.

7. A vehicle according to claim 5, wherein the side doors and the end door assembly are hinged at least two feet from said end of the vehicle.

8. A vehicle according to claim 5, wherein the side doors and the end door assembly are hinged at least 30% of the vehicle's length from said end of the vehicle.

9. A vehicle according to claim 5, wherein the rear door has a forwardly-facing surface and the side doors have a rear edge which engages the forwardly facing surface of the rear door.

10. A vehicle according to claim 1, wherein the vehicle is a trailer which has a front end and a rear end, said front end having a hitch which is engagable by a towing vehicle, said end door being located at the rear end of the trailer.

11. A vehicle according to claim 10, in combination with a towing vehicle connected to said hitch for towing said trailer.

12. A vehicle according to claim 11, said trailer being horizontally swingable about said hitch relative to said towing vehicle.

13. A vehicle according to claim 1 having a width which is no more than five feet.

14. A vehicle, comprising:

said vehicle having an end provided with an end door assembly which includes an end door and a movable roof panel which are rigidly connected together;

said movable roof panel being substantially perpendicular to said end door and being upwardly swingable from a closed lower position to a raised open position;

said end door being upwardly swingable with said roof panel from a closed lower position to a raised upper position;

two side doors on opposite sides of the vehicle, each of said side doors being outwardly swingable from a closed position to an open position;

each of the side doors and the roof panel being hinged substantially in a same transverse vertical plane, said transverse vertical plane being at least two feet from said end of the vehicle;

each of said side doors having edges which engage and seal against the end door and said roof panel when the movable roof panel, the end door, and the side doors are in their closed positions.

15. A vehicle according to claim 14, wherein the vehicle is a trailer which has a front end and a rear end, said front end having a hitch which is engagable by a towing vehicle, said end door being located at the rear end of the trailer.

16. A vehicle according to claim 14 having a width which is no more than five feet.

17. A vehicle, comprising:

an end provided with an end door assembly which includes an end door and a movable roof panel which are rigidly connected together;

said movable roof panel having a width which is less than one-half the width of the rear door, and being upwardly swingable from a closed lower position to a raised open position;

said end door being upwardly swingable with said roof panel from a closed lower position to a raised upper position;

a side door on a side of the vehicle, said side door being outwardly swingable from a closed position to an open position;

said side door having edges which engage and seal against the end door and said roof panel when the movable roof panel, the end door, and the side door are in their closed positions.

18. A vehicle, comprising:

an end provided with an end door assembly which includes an end door and a movable roof panel which are rigidly connected together;

said movable roof panel being upwardly swingable from a closed lower position to a raised open position;

said end door being upwardly swingable with said roof panel from a closed lower position to a raised upper position;

a side door on a side of the vehicle, said side door being outwardly swingable from a closed position to an open position;

said side door and said roof panel being hinged substantially in a same transverse vertical plane;

said side door having edges which engage and seal against the end door and said roof panel when the movable roof panel, the end door, and the side door are in their closed positions.

19. A vehicle, comprising:

a vehicle end provided with an end door assembly which includes an end door and a movable roof panel which are rigidly connected together;

said movable roof panel being upwardly swingable from a closed lower position to a raised open position;

said end door being upwardly swingable with said roof panel from a closed lower position to a raised upper position;

side doors located on opposite sides of the vehicle, said side doors being horizontally and outwardly swingable from a closed position to an open position;

said movable roof panel being located between said side doors;

said side doors having edges which engage and seal against the end door and said roof panel between said side doors when the movable roof panel, the end door, and the side door are in their closed positions.

* * * * *